(12) United States Patent
Borra et al.

(10) Patent No.: US 11,403,293 B1
(45) Date of Patent: Aug. 2, 2022

(54) DATABASE SCANNING TOOL FOR OPTIMIZING QUERIES

(71) Applicant: West Corporation, Omaha, NE (US)

(72) Inventors: Lakshmi T. Borra, Omaha, NE (US); Joshua K. Cordoba, Omaha, NE (US); Steven A. Heithoff, Omaha, NE (US); Roger Henson, Ralston, NE (US); Prashanth Katakam, Omaha, NE (US); Sneha S. Vairagade, Omaha, NE (US); Gregory A. Weigner, Bellevue, NE (US)

(73) Assignee: Intrado Corporation, Omaha, NE (US)

( * ) Notice: Subject to any disclaimer, the term of this patent is extended or adjusted under 35 U.S.C. 154(b) by 438 days.

(21) Appl. No.: 15/888,259

(22) Filed: Feb. 5, 2018

(51) Int. Cl.
*G06F 16/2453* (2019.01)
*G06F 16/242* (2019.01)
*G06F 16/835* (2019.01)

(52) U.S. Cl.
CPC .... *G06F 16/24535* (2019.01); *G06F 16/2423* (2019.01); *G06F 16/8365* (2019.01)

(58) Field of Classification Search
CPC ........... G06F 16/24535; G06F 16/8365; G06F 16/2423; G06F 16/242
USPC .......................... 707/702, 713, 774, 769, 770
See application file for complete search history.

(56) References Cited

U.S. PATENT DOCUMENTS

| | | | | |
|---|---|---|---|---|
| 6,484,161 B1* | 11/2002 | Chipalkatti | ........... | G06F 16/951 707/999.003 |
| 7,870,121 B2* | 1/2011 | Chang | ................. | G06F 16/8365 707/713 |
| 9,330,149 B2* | 5/2016 | Angrish | ................ | G06F 16/258 |
| 10,116,725 B2* | 10/2018 | Wells | ..................... | G06F 9/5033 |
| 10,977,249 B2* | 4/2021 | Ryu | .................... | G06F 16/24539 |
| 2009/0089866 A1* | 4/2009 | Yato | ..................... | G06F 21/6218 726/2 |
| 2009/0112853 A1* | 4/2009 | Nishizawa | ........ | G06F 16/24568 707/999.005 |
| 2009/0158251 A1* | 6/2009 | Angrish | ................ | G06F 16/258 707/999.102 |
| 2009/0182762 A1* | 7/2009 | Chang | ................. | G06F 16/8365 707/999.102 |
| 2010/0036831 A1* | 2/2010 | Vemuri | ............. | G06F 16/24568 707/718 |
| 2011/0040776 A1* | 2/2011 | Najm | ...................... | G06F 16/36 707/766 |
| 2017/0228460 A1* | 8/2017 | Amel | ................... | G06F 16/2462 |
| 2017/0344605 A1* | 11/2017 | Wells | ..................... | G06F 9/5033 |
| 2017/0346875 A1* | 11/2017 | Wells | ..................... | G06F 9/5033 |
| 2019/0057130 A1* | 2/2019 | Ryu | ....................... | G06F 16/256 |

OTHER PUBLICATIONS

W3schools, SQL Stored Procedures for SQL Server, https://www.w3schools.com/sql/sql_stored_procedures.asp, Copyright 1999-2021.*

* cited by examiner

Primary Examiner — Phong H Nguyen

(57) ABSTRACT

A query management application provides performing an initial query to retrieve records stored in a database, storing the records as initial query content in a memory, creating a file with a list of commands used during the initial query, initiating a subsequent query to obtain updated information for the records, retrieving the file and applying the list of commands to the subsequent query, performing the subsequent query, and updating the memory with results of the subsequent query.

12 Claims, 4 Drawing Sheets

DATABASE SCANNING TOOL FOR OPTIMIZING QUERIES

TECHNICAL FIELD OF THE APPLICATION

This application relates to optimizing queries and more specifically to a command input application that processes queries by scanning for previous query information which may be combined with a current query.

BACKGROUND OF THE APPLICATION

Conventionally, queries submitted and processed by query processing software are often initiating an entirely new query with new metadata, parameters and other query essential information. The time and the amount of processing required to process a query depends on various factors, however, starting a new query requires various processes and information be created in order to execute the query on a query processing platform. Also, differences between data are not easily recognized and an audit trail has limitations on what information is maintained for future audits.

SUMMARY OF THE APPLICATION

Example embodiments of the present application provide at least a method that includes at least one of performing an initial query to retrieve a plurality of records stored in a database, storing the plurality of records as initial query content in a memory, creating a file comprising a list of commands used during the initial query, initiating a subsequent query to obtain updated information for the plurality of records, retrieving the file and applying the list of commands to the subsequent query, performing the subsequent query, and updating the memory with results of the subsequent query.

Another example embodiment may include an apparatus that includes a processor configured to perform an initial query to retrieve a plurality of records stored in a database, store the plurality of records as initial query content in a memory, create a file comprising a list of commands used during the initial query, initiate a subsequent query to obtain updated information for the plurality of records, retrieve the file and apply the list of commands to the subsequent query, perform the subsequent query, and update the memory with results of the subsequent query.

Still another example embodiment may include a non-transitory computer readable storage medium configured to store instructions that when executed cause a processor to perform at least one of performing an initial query to retrieve a plurality of records stored in a database, storing the plurality of records as initial query content in a memory, creating a file comprising a list of commands used during the initial query, initiating a subsequent query to obtain updated information for the plurality of records, retrieving the file and applying the list of commands to the subsequent query, performing the subsequent query, and updating the memory with results of the subsequent query.

DETAILED DESCRIPTION OF THE APPLICATION

Figure 1:
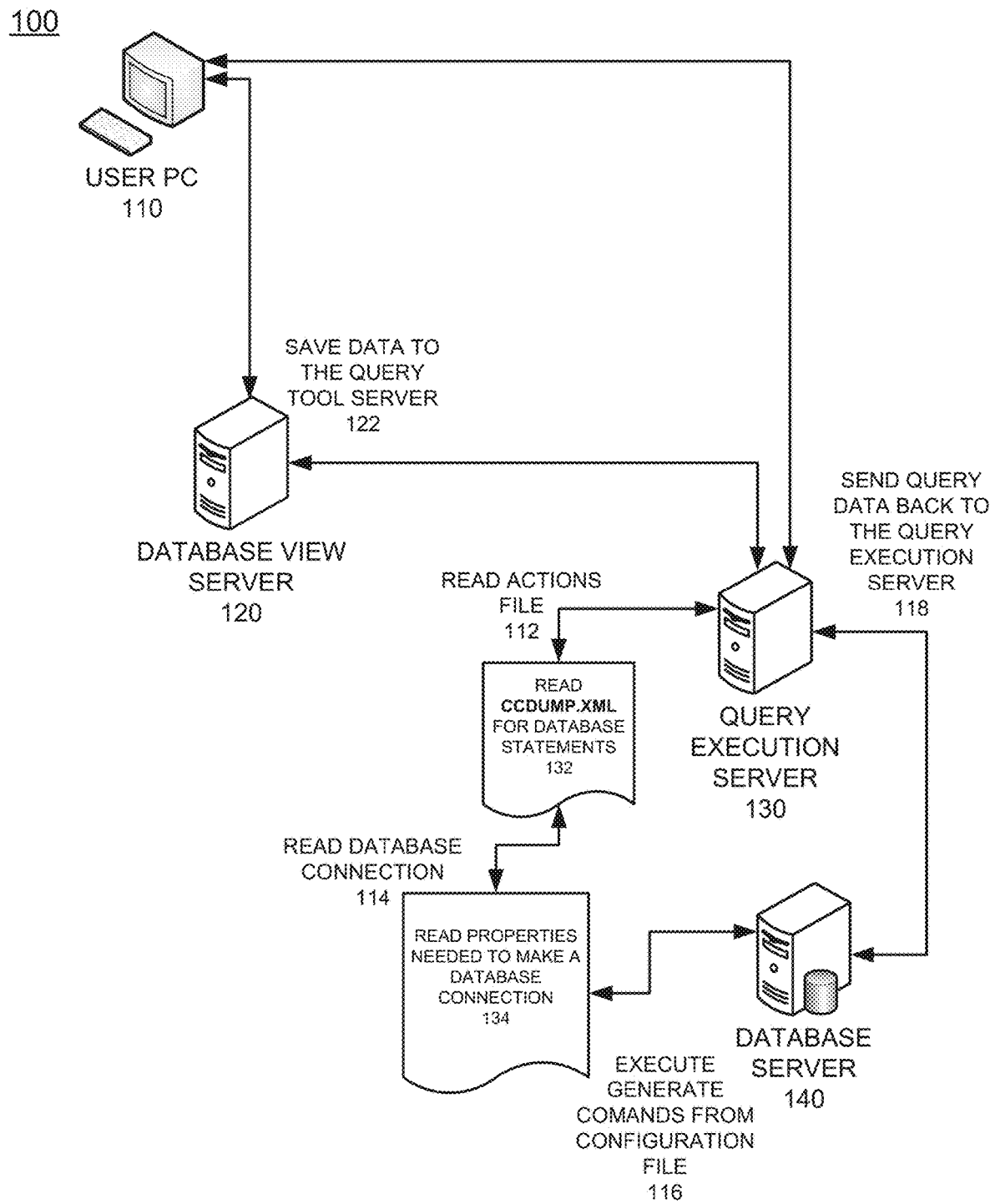
FIG. 1 illustrates an example network configuration for monitoring and isolating network faults over various sub-networks according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to one example embodiment, an extensible markup language (XML) software 'tool' configuration permits a user interface to receive simple input commands from an XML file to assist with ongoing query efforts. The query tool will search and generate metadata in a database based on a request message created to identify the metadata. The query tool is data driven, and so data from one submitted query can then be later used in subsequent queries, which provides for saving metadata/configuration values of a database for reference and retrieval purposes during the later submitted queries.

In one example, the tool can be used with various different databases. The data may be saved in an XML format file. A script can then be used (i.e., saveCC script) to save information, such as 'DBScanner data' to a data repository (i.e., query tool server repository) for subsequent viewing by a database manager. Also, the history of changes made are all fully documented since previous snapshots of the database can be compared to new snapshots to permit optimal difference identifications between snapshots. This enables changes to quickly identified and changed, approved, modified, etc. The query tool enables the saving of data between queries and also enables the quick use of such data for subsequent queries.

The queries which are sent to the database may be based on both the data received from past queries as well as the present configuration. The actions may include accessing many different large-scale database table groups, for example, a database table group may be referred to as 'campaign central' data tables and those results can be saved in memory for reference and audit/comparison purposes. A list of current tables queried from campaign central databases may include, but are not limited to format tables: format_reference, format_table_detail, format_pod, format_ftp_load, filterable_columns, and 'campaign' tables: campaign types, campaign_type_urls, campaign_manager, campaign_schedule, campaign_condition, campaign_condition_attrs, campaign_throttle, and other data tables which need to be audited, such as: program_info, client_info, retry_strategy, retry_strategy_rule, and retry_strategy_action. Also, the schema can also be accessed to identify any changes (i.e., deltas/differences) between snapshot comparison efforts borne out of the queries. The tables may be retrieved one at a time and updated in memory for quick access and comparison over a predefined period of time so that the entire query effort (i.e. all tables) do not need to be retrieved at one single time/query, which could be burdensome to review for the database reviewer.

Another example may include joining two queries and/or using the output data from a previous query for future queries. An example use of 'keys' may include a <scan name="format_reference", keys="format_id,client_id" where="table_name,myFormat"/>. This example XML tag instructs a 'dbscanner' function or audit function to scan a table called 'format_reference' for all data that matches a 'table_name' field with the input 'myFormat' (a user inserts this value from command line). Then, the data for variables 'format_id' and 'client_id' columns are saved. The data can be stored in memory, such as a shared memory and used in future queries using the values 'format_id', 'client_id' as shown in the XML tag: <scan name="format_table_detail" where="format_id,format_id"/>. The 'format_id' created in the above XML statement is used as a parameter to limit data to the user requested format table.

The XML tool provides a complete metadata record of changes made in the database view server. Also, users may view and compare values set in the application query tool before and after changes. Another use of the application query tool is to reduce the manual checking of the campaign central GUI. This application query tool permits a user to easily compare data before and after a release data.

FIG. 1 illustrates an example network configuration for monitoring and isolating network faults over various sub-networks according to example embodiments. Referring to FIG. 1, the network 100 includes a user computer 110, a database view server 120, which manages the subsequent and repeated queries, a query execution server 130, which executes the queries and a database server 140, which may store the information being queried.

In operation, the queries submitted may be identified and logged 122 in the database view server 120 for future queries, so the query information can be re-used in a subsequent query. The process may begin with a query being submitted. The query contents may be identified and the order of commands in the query can be saved to a 'CCDUMP.XML' file 132, which is read for actions 112 to perform in the next query. The database connection may be identified from a read operation 114, which may include reading properties needed to make a database connection 134. The database server 140 may execute and generate commands from a configuration file 116. The query that is generated may be based on previous commands and variables which were created during an earlier query. The query data can be sent back to the query execution server 118 during a query cycle.

The queries may be any database query, such as SQL queries or other database queries known to one skilled in the art. In the initial query operation, the user may view webtools on the database view server 120 to view any changes from updated queries, the database view server 120 could be related to a generic function. For example, a snapshot may be an entire data dump stored in memory of all tables being accessed during the query. A next snapshot could be built by retrieving the same named tables identified in the query and comparing the updated tables in the next snapshot to the previous snapshot once all tables have been again retrieved. The differences are presentable to a user interface so changes can be highlighted and displayed to the user interface. This permits the database manager to identify the changes and whether to correct those changes, if necessary. The query tool provides a complete metadata record of changes made in the database view server 120, which permits the user to view and compare values set in the application, such as before and after changes. In operation, the user may be executing 'savecc database.properties' to the query execution server 130.

A query may provide <actions>, which is a root of the document that instructs the query what database actions to perform. The basic actions may include "get", "connect", "comment", "scan" and "schematable name". The "get" command obtains the variable names to retrieve, the "connect" command reads the identified database name, the "comment" command adds a comment for user specified identification purposes, the "scan" command performs the majority of query functions, such as the tables to scan, and the "schematable" command accesses the schema to determine if any changes were made to the schema.

One example is <get name="variablename" commandline="position"/>, which obtains a value from the command line and adds it to global memory for the database. Another example is <conn config="configfilename"/>, which read in the configuration file used to connect to a database. Example files are included for IBM90 and IBM558, however, one skilled in the art will readily identify other types of systems which are compatible with the querying operations described in the various examples. Another example command is <comment text="XML comment to place"/>, <scan name="table to scan" keys="comma separated list of field names to be added to the global memory for later use", where="fieldtosearch, valuesearchfor"/>, <schematable name="table to get the basic schema information for"/>. This provides a predefined list of commands that that will be executed when a user executes the query.

According to certain examples, 'campaign central' is a web-based tool that provides the ability to create, manage, monitor and view reports for outbound notification campaigns. This tool permits clients to filter notifications based on a parameters set. This may be any database that is customized for a query operation. An example list of current tables queried from campaign central databases include: format_reference, format_table_detail, format_pod, format_ftp_load, filterable_columns. Example embodiments provide for an XML format that can be used with any database, which is more optimal than developing standard queries to retrieve needed data. The read operations may obtain the required values needed for establishing a database connection such as username, password, driver, URL. The configuration file may contain details, such as a database user, a database password, driver details and/or a database URL. The data that is identified from the queries and kept for future queries may include <data searchby="tuvnrc_experience" column="format_name" value="experience"/>. This information may identify how the application found the information a by what keyword(s). The column value may specify the column that the data is located in the database, and the value is the value in the record. This information may be stored in the database view server 120. The tools may then contain a list of all changes that were made to the data, such as a view to identify what has changed in the database. The commands are executed and added to the database view server 120.

In one example of a query submitted by a user, a user may enter a command to retrieve a shopping list '1'. A first query would return something like bacon, eggs, and cheese and would save bacon, eggs, and cheese for later queries. Without any changes to the code the process may provide running a query for each: get me a list of bacon, get me a list of eggs, get me a list of cheese. An example output may be bacon, eggs, cheese with multiple instances of a product name, a type (i.e., smoked, maple, etc.), a maker (i.e., XYZ company, ABC company), and a price (i.e., various prices). A third query uses the price field to obtain all products in the store with a price that matched the prices identified.

One query to the next may include saving information from the queries to certain variables that can be used for other queries. The command 'saveCC' is the initial command to start the process when the user enters a 'savecc' client. Then, the process continues by executing all the commands to produce metadata. The 'saveCC' is a script which sends output to the query view server, which uses query tools to view a history of how the database data as changed. A 'Dbscanner' is a tool created to read and configure the XML files and performs most of the execution of the query. Most queries are using the DBscanner tool. The 'saveCC' is a script that sends output to the query database. From there, query tools are used to view or see history of how the database data as changed.

One example method of operation may provide executing an initial query for a plurality of records stored in a database, such as database server 140, the query may begin from the user PC 110 and may be executed by the query execution server 130. The records retrieved from the database may be stored in a XML file. The XML file may be a dump file that includes the retrieved data of the tables and a list of commands from the initial/previous query, which can be used in a subsequent query. One or more database field names may be identified and used to retrieve the corresponding records, which should be included in memory. Now that the initial query information is stored in the memory, the subsequent query efforts to update table information for comparison purposes to previous tables retrieved may provide creating a temporary query file to the database. The query statements to include in the temporary query file can be extracted and copied from the XML dump file and used in the temporary query file for the subsequent query attempts. The process may continue to provide updates for the database tables of interest and the comparison of recently queried tables to previously queried tables may be provided in a user interface to identify changes that have occurred. This enables the database developer/manager to accept, reject, modify, etc., the changes identified.

Figure 2:
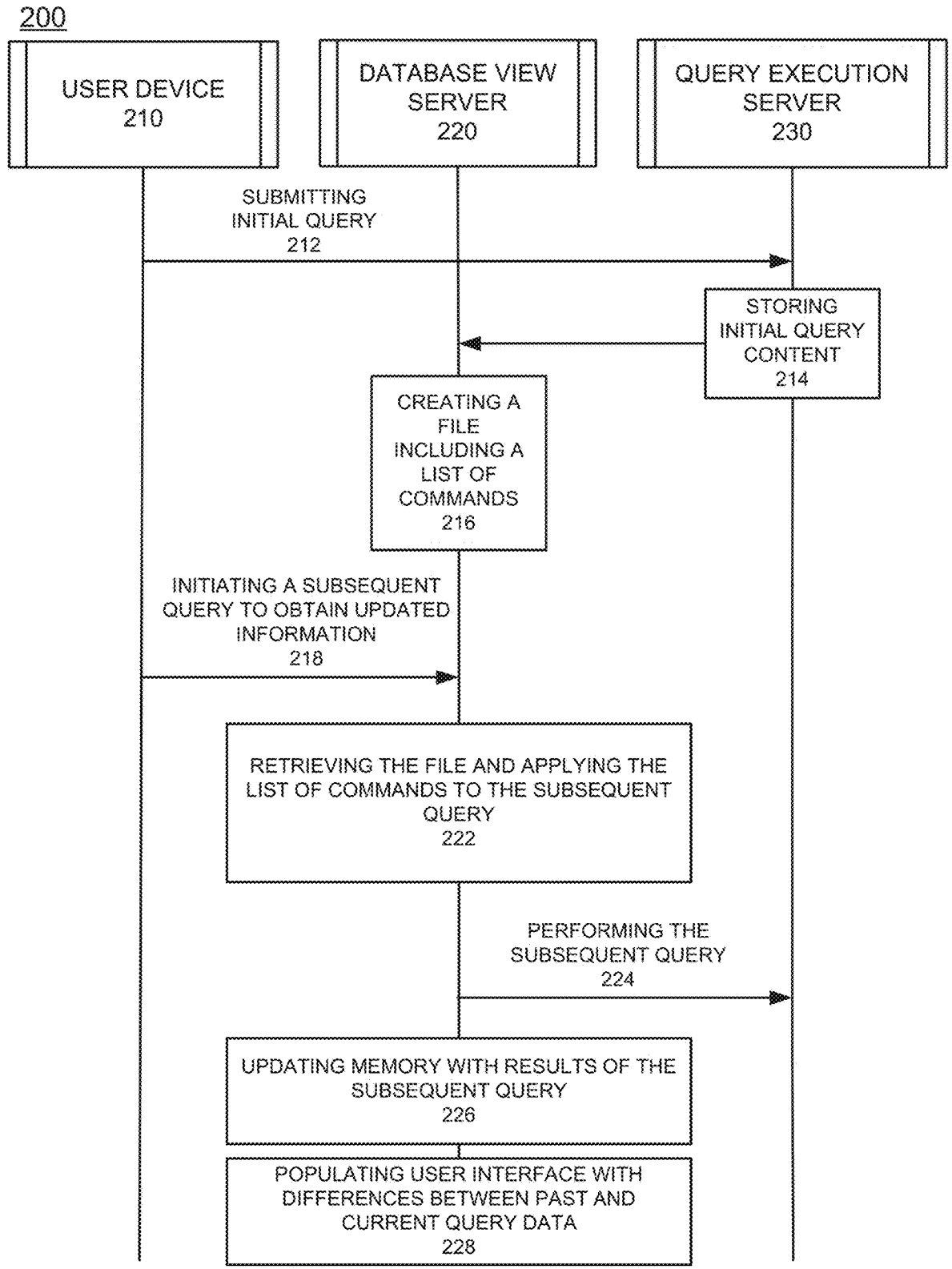
FIG. 2 illustrates a system signaling diagram configuration of communications between the query input device and the query processing servers according to example embodiments.

FIG. 2 illustrates a system signaling diagram configuration of communications between the query input device and the query processing servers according to example embodiments. Referring to FIG. 2, the system configuration 200 may provide a method that includes a user device 210 performing an initial query 212 to retrieve a plurality of records stored in a database. The query execution server 230 may receive the query and forward the query to the database. The results of the query are returned and stored as initial query content 214. The plurality of records may be recognized as initial query content stored in memory. The process continues with creating a file comprising a list of commands used during the initial query 216, which can be used by the database view server 220 to analyze the query results and compare the results to subsequent query data. The method may also include initiating a subsequent query to obtain updated information for the plurality of records 218 and retrieving the file and applying the list of commands to the subsequent query 222. The method may also include performing the subsequent query 224, and updating the memory with results of the subsequent query 226. The initial query is received from the user device 210 and processed by the query execution server 230. The file may be an extensible markup language (XML) file. The method may also include storing retrieved data from the initial query and the list of commands in the XML file, and where the list of commands were used to perform the initial query. The method may also include creating a temporary query file comprising the list of commands, and transmitting the temporary query file to the database to perform the subsequent query. The method may also include updating the memory with content from the subsequent query. The method may further include populating a user interface with differences between the initial query content and the content from the subsequent query 228.

Figure 3:
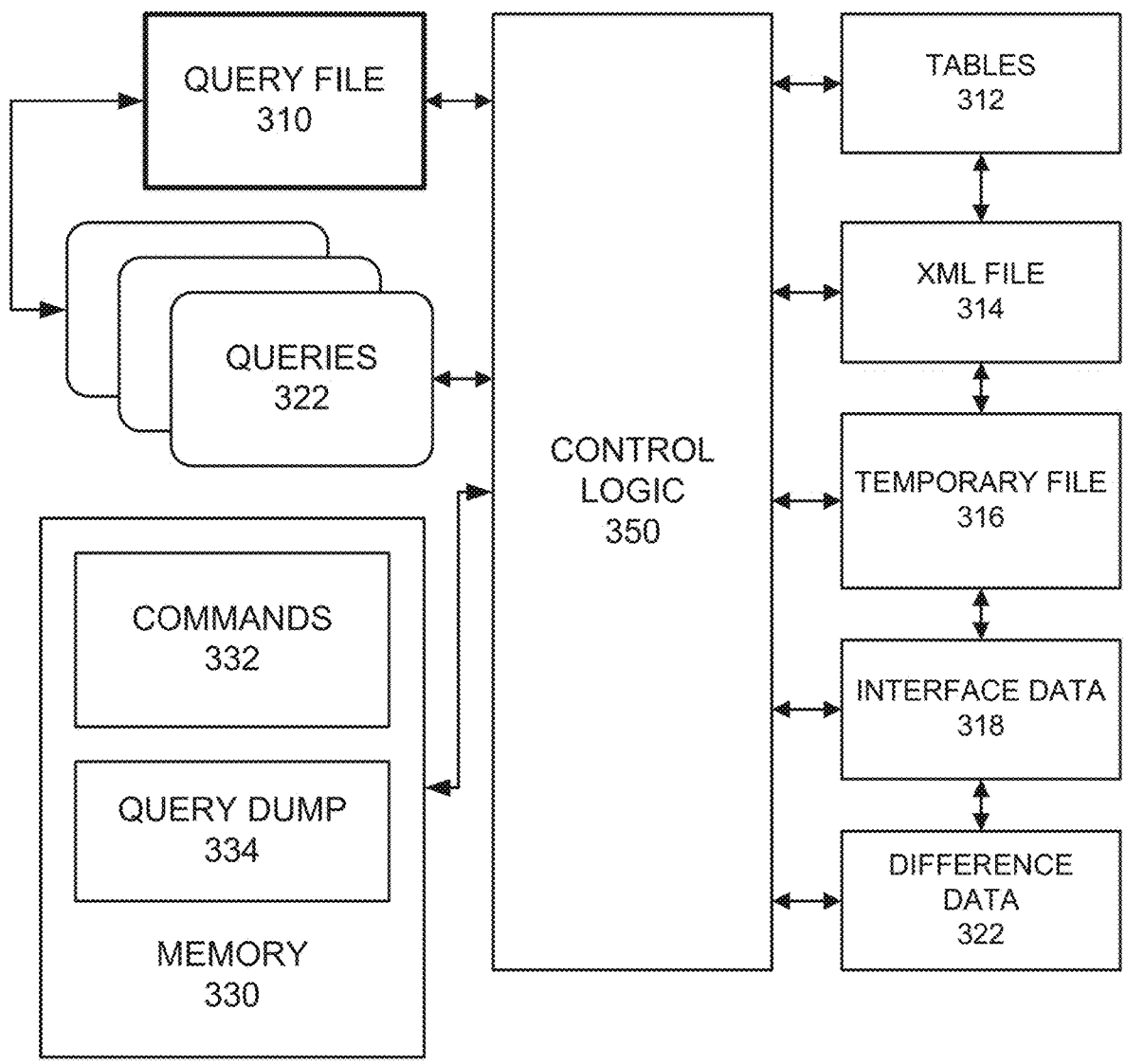
FIG. 3 illustrates a logic diagram for processing queries according to example embodiments of the present application.

FIG. 3 illustrates a logic diagram for processing queries according to example embodiments of the present application. Referring to FIG. 3, the logic 300 processed by the control logic unit 350 may be identified as a list of commands or operations stored in the query file 310. The queries 322 may be set to occur periodically according to an automated schedule. Each query may obtain a portion of the relevant campaign data needed to compare the previous snapshot to the current snapshot and identify data differences. The memory file 330 may include the content of the query dump 334 and the commands 332 needed to perform the queries. The output of the query logic may include one or more tables 312, an XML file 314 with the data dump and/or the commands needed for subsequent queries, a temporary file 316 created for each query cycle based on content of the XML file and used by the database to perform the query, interface data 318 which populates the user interface accessible from the database view server 220 by the client user device 210, and a list of difference data 322 to highlight the changes that should be identified by a database manager. Changes, modifications, and any other information can be easily identified and actions necessary to correct those changes can be made without arduous task assignment time.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent any of the above-described network components of the other figures.

Figure 4:
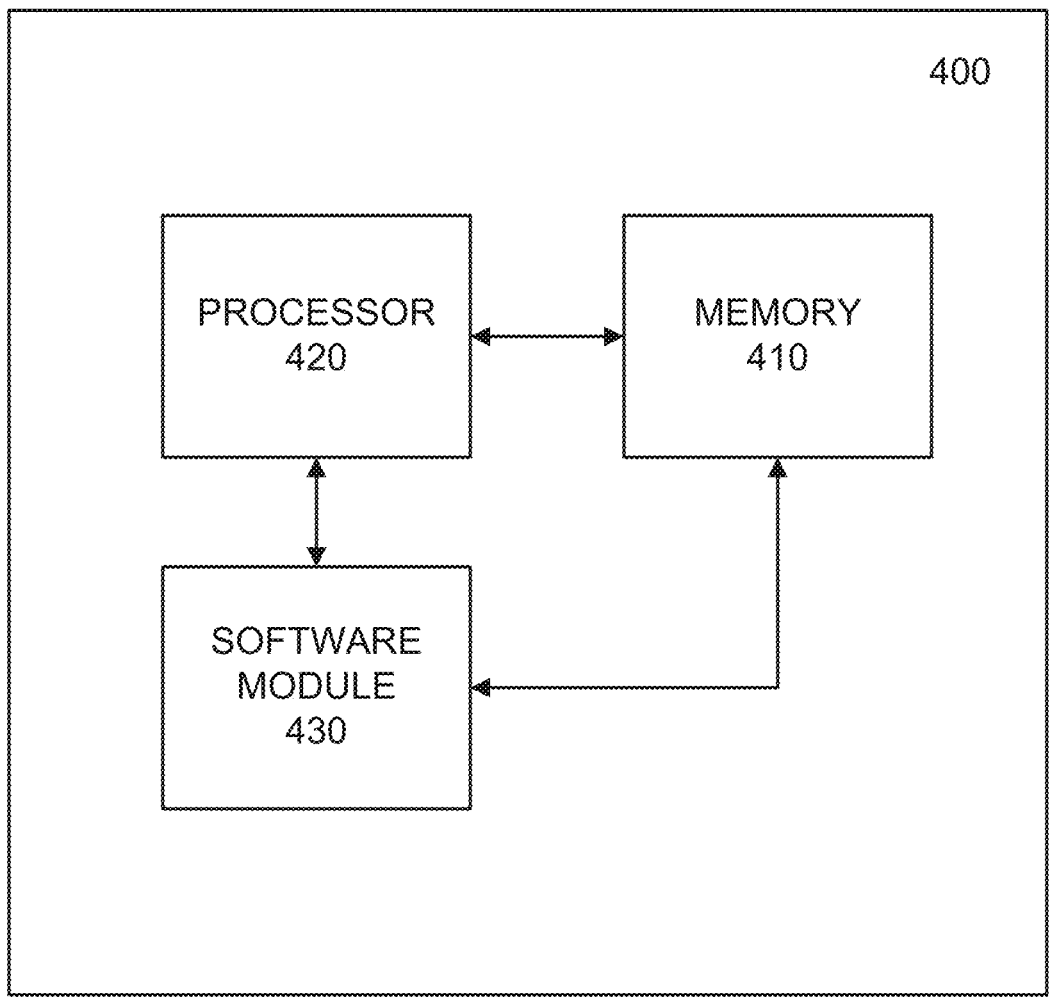
FIG. 4 illustrates an example network entity device configured to store instructions, software, and corresponding hardware for executing the same, according to example embodiments of the present application.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:

creating, by a server device, a file comprising a list of commands used in an initial query made by a user device, the initial query to retrieve initial query content comprising a plurality of records, wherein the initial query content is to be stored in a memory associated with the server device;

creating, by the server device, and for each subsequent query, a temporary query file comprising the list of commands based on the file;

receiving, by the server device, a particular subsequent query to obtain updated information for the initial query content;

retrieving, by the server device, a temporary query file associated with the particular subsequent query;

applying, by the server device, the list of commands to the particular subsequent query;

performing, by the server device, the particular subsequent query to generate content from the particular subsequent query; and updating, by the server device, the memory with the content from the particular subsequent query.

2. The method of claim 1, wherein the file is an extensible markup language (XML) file.

3. The method of claim 2, further comprising:

storing retrieved data from the initial query and the list of commands in the XML file, wherein the list of commands were used to perform the initial query.

4. The method of claim 1, further comprising:

populating a user interface with differences between the initial query content and the content from the particular subsequent query.

5. An apparatus, comprising:

a processor configured to:

create a file comprising a list of commands used in an initial query made by a user device, the initial query to retrieve initial query content comprising a plurality of records, wherein the initial query content is to be stored in a memory associated with the processor;

create, for each subsequent query, a temporary query file comprising the list of commands based on the file;

receive a particular subsequent query to obtain updated information for the initial query content;

retrieve a temporary query file associated with the particular subsequent query;

apply the list of commands to the particular subsequent query;

perform the particular subsequent query to generate content from the particular subsequent query; and update the memory with the content from the particular subsequent query.

6. The apparatus of claim 5, wherein the file is an extensible markup language (XML) file.

7. The apparatus of claim 6, wherein the processor is further configured to:

store retrieved data from the initial query and the list of commands in the XML file, wherein the list of commands were used to perform the initial query.

8. The apparatus of claim 5, wherein the processor is further configured to:

populate a user interface with differences between the initial query content and the content from the particular subsequent query.

9. A non-transitory computer readable storage medium configured to store one or more instructions that when executed by a processor of a server device causes the processor to perform:

creating a file comprising a list of commands used in an initial query made by a user device, the initial query to retrieve initial query content comprising a plurality of records, wherein the initial query content is to be stored in a memory associated with the server device;

creating, for each subsequent query, a temporary query file comprising the list of commands based on the file;

receiving a particular subsequent query to obtain updated information for the initial query content;

retrieving a temporary query file associated with the particular subsequent query;

applying the list of commands to the particular subsequent query;

performing the particular subsequent query to generate content from the particular subsequent query; and updating the memory with the content from the particular subsequent query.

10. The non-transitory computer readable storage medium of claim 9, wherein the file is an extensible markup language (XML) file.

11. The non-transitory computer readable storage medium of claim 10, wherein the one or more instructions further cause the processor to perform:

storing retrieved data from the initial query and the list of commands in the XML file, wherein the list of commands were used to perform the initial query.

12. The non-transitory computer readable storage medium of claim 9, wherein one or more instructions further cause the processor to perform:

populating a user interface with differences between the initial query content and the content from the subsequent query.

* * * * *